(12) United States Patent
Anderson et al.

(10) Patent No.: US 6,498,623 B1
(45) Date of Patent: Dec. 24, 2002

(54) SYSTEM AND METHOD FOR GENERATING VARIABLE-LENGTH TIMING SIGNALS IN AN ELECTRONIC IMAGING DEVICE

(75) Inventors: Eric Anderson, San Jose, CA (US); John Carl Walker, Pleasanton, CA (US)

(73) Assignee: Flashpoint Technology, Inc., Peterborough, NH (US)

( * ) Notice: Subject to any disclaimer, the term of this patent is extended or adjusted under 35 U.S.C. 154(b) by 0 days.

(21) Appl. No.: 08/964,036

(22) Filed: Nov. 4, 1997

(51) Int. Cl.[7] ............................................. H04N 5/335
(52) U.S. Cl. ................................. 348/312; 348/221.1
(58) Field of Search ............................... 348/229, 230, 348/249, 296, 297, 298, 311, 312, 317, 362, 231, 320, 322, 221, 222, 250, 230.1, 229.1, 231.6, 222.1, 221.1; 377/52, 54, 62, 63, 64

(56) References Cited

U.S. PATENT DOCUMENTS

| | | | | |
|---|---|---|---|---|
| 4,723,169 A | * | 2/1988 | Kaji .............................. | 348/250 |
| 4,866,292 A | * | 9/1989 | Takemoto et al. ........... | 348/296 |
| 5,040,070 A | * | 8/1991 | Higashitsutsumi et al. . | 348/229 |
| 5,043,801 A | * | 8/1991 | Watanabe .................... | 348/230 |
| 5,477,264 A | | 12/1995 | Sarbadhikari et al. ....... | 348/231 |
| 5,493,335 A | | 2/1996 | Parulski et al. .............. | 348/233 |
| 5,523,786 A | * | 6/1996 | Parulski ....................... | 348/221 |
| 5,742,659 A | * | 4/1998 | Atac et al. ................... | 378/98.8 |
| 5,841,471 A | * | 11/1998 | Endsley et al. .............. | 348/231 |
| 6,005,618 A | * | 12/1999 | Fukui et al. ................. | 348/312 |

FOREIGN PATENT DOCUMENTS

JP 1-238382 * 9/1989

* cited by examiner

Primary Examiner—Aung S. Moe
(74) Attorney, Agent, or Firm—Sawyer Law Group LLP

(57) ABSTRACT

The present invention includes a system and method for generating variable-length timing signals in an electronic imaging device. A digital camera device includes an electronic image sensor which requires a complex set of timing signals to effectively capture image data. The digital camera therefore also includes timing generation circuitry which generates a set of precise timing signals for a variable-length frame time necessary to control and synchronize the electronic image sensor within the digital camera. The present invention includes a transfer substrate charge (Xsub) source circuit and a frame time source circuit, each containing a downcounter. The point in time when the downcounters reach zero is available as a precise and programmable timing reference. Both the Xsub time and frame time source circuits are loaded from registers under software control.

19 Claims, 11 Drawing Sheets

SYSTEM AND METHOD FOR GENERATING VARIABLE-LENGTH TIMING SIGNALS IN AN ELECTRONIC IMAGING DEVICE

CROSS-REFERENCE TO RELATED APPLICATION

This application relates to co-pending U.S. patent application Ser. No. 08/891,857, entitled "System and Method for Generating Timing Signals in an Electronic Imaging Device," filed on Jul. 9, 1997, which subject matter is hereby incorporated by reference. The above cross-referenced patent application has been commonly assigned to the Assignee of the present patent application.

BACKGROUND OF THE INVENTION

1. Field of the Invention

This invention relates generally to electronic imaging devices and more particularly to a system and method for generating timing signals in an electronic imaging device.

2. Description of the Background Art

The efficient operation of electronic imaging devices provides computer users with new and effective ways to capture and process various types of image data. Electronic imaging devices typically include special electronic image sensors that convert a selected image into electronic data. These electronic image sensors conventionally include a series of discrete picture elements (or pixels) which convert light reflected from a photographic target into electrical energy that is then shifted out of the image sensor device. Due to the complexity of the high-speed process involved in shifting captured image data out of the image sensor, electronic imaging devices require a series of precise timing pulses to successfully gate the image data from the image sensor. Electronic imaging devices (such as digital cameras) typically include a timing generator device that effectively generates and provides the precise timing pulses to the electronic image sensor.

Referring now to FIG. 1, a timing diagram of frame timing for a conventional digital camera is shown. Electronic imaging devices using image sensors, such as charge-coupled devices (CCDs), were traditionally used in video applications. The National Television Standard Committee (NTSC) video used in North America is typically displayed at 60 fields per second, and interlaced at 2 fields per video frame. Thus standard video is typically implemented at a fixed rate of 30 frames per second. The Sequential Couleur Avec Memoire (SECAM) video used in France and the Phase Alternating Line (PAL) video used in other parts of Europe is typically displayed at 50 fields per second, for a fixed rate of 25 frames per second. Hereinafter video in compliance with the NTSC standard will be addressed, but it is to be understood that the discussion will also apply to SECAM and PAL.

When electronic imaging devices were initially used for purposes other than video, the existing circuitry was adapted for this new use. Hence, conventional electronic imaging devices typically use a fixed frame rate of 30 frames per second. FIG. 1 shows a series of fixed time period frames each having a length of $1/30^{th}$ of a second, which corresponds to a frame rate of 30 frames per second.

Image sensors such as CCDs operate as an array of photodiodes. Each photodiode generates electrons from the incident light photons. The electrons are stored in a corresponding capacitive element whose voltage output is proportionate to the stored charge. Prior to capturing an image, the image sensor is kept in a discharged state. When the image sensor is set to capture an image, the charge is allowed to build up in each element of the array for the period of the exposure in proportion to the intensity of the incident light. The voltage resulting from this charge may then be read from each element of the array and subsequently changed into digital form.

This sequence of events is shown in the timing diagram of FIG. 1. The fixed frame time is set to $1/30^{th}$ of a second. The transfer substrate charge time period, called the Xsub time, is the period in which the image sensor is kept in a discharged state. The Xsub time begins simultaneously with the beginning of the frame time 70. At the end of the Xsub time 72 the exposure time begins. When the exposure is complete, at the end of the exposure time 74, the charge from the array of photodiodes is transferred simultaneously into a parallel array of analog storage locations, and then the photodiode array is discharged during the next Xsub time. As the next Xsub time begins, at the beginning of the next frame time 74, the image analog signals in the parallel array of analog storage locations are separately converted to digital form and shifted into a digital input buffer during the data shift time. When the data shifting is complete, at time 76, the digital processing circuits are ready to convert another exposure. This process of data shifting must be complete prior to the beginning of the next frame, which initiates analog transferring of the charges from the photodiode array to the parallel array of analog storage elements. Otherwise the next exposure's charges would overwrite the analog data from the previous exposure.

There are at least two significant problems that arise from the frame time being fixed at 30 frames per second. A first problem is that in low light conditions the exposure may ideally need to be longer than $1/30^{th}$ of a second (a conventional frame period). A second problem is that the digital camera may not be able to complete data shifting prior to the beginning of the next frame period. Since the frame period is fixed, these situations require the skipping of frames. Skipping every other frame allows for an effective frame time of $1/15^{th}$ of a second, and skipping two out of every three frames allows for an effective frame time of $1/10^{th}$ second.

Frame skipping allows both exposure times and data shifting times to be longer than the fixed frame time of $1/30^{th}$ of a second. The drawback of frame skipping is that it may cause unsteady motion in the viewfinder of the electronic imaging device if the rate is too low. Human perception of image motion becomes sensitive to frame rate changes in the range below approximately 20 frames per second. As an example, one of the reasons that Super 8 mm motion picture film quickly supplanted standard 8 mm film is that the frame rate was increased from 16 frames per second to 18 frames per second. This numerically small difference is enough to make the resulting motions appear much more smooth and lifelike. Current theatrical motion picture film uses 24 frames per second, and video, as mentioned above, typically uses 30 frames per second.

Electronic image sensor devices are currently evolving to become increasingly more complex and thus require timing generators with more advanced capabilities and greater flexibility. Therefore, an improved system and method are needed for generating timing signals in an electronic imaging device.

SUMMARY OF THE INVENTION

In accordance with the present invention, a system and method are disclosed for generating variable-length timing signals in an electronic imaging device. In the preferred embodiment of the present invention, a digital camera device includes an electronic image sensor that requires a complex set of timing signals to effectively capture image data. The digital camera therefore also includes timing source circuitry which generates a set of precise timing signals for a variable-length frame time necessary to control and synchronize the electronic image sensor within the digital camera.

Three timing components are necessary to control and synchronize the electronic image sensor: a frame time, an exposure time, and a transfer substrate charge (Xsub) time. Any two of these time periods may be selected as independent variables, the third time period being dependent on the selected two time periods. In the preferred embodiment, the present invention includes an Xsub time source circuit and a frame time source circuit. The Xsub time source circuit and frame time source circuit each contain a downcounter. These devices decrement internal binary values every time a clock pulse is applied. When loaded with a specified binary value, they decrement to the value zero after a time period equal to the specified value multiplied by the clock pulse period. The points in time when the downcounters reach zero are thus available as precise and programmable timing references.

In the preferred embodiment of the present invention, the Xsub time downcounter and frame time downcounter are clocked by the horizontal drive (HD) pulses. These HD pulses are sufficiently short in duration to give a high resolution to the programmed time intervals. Both the Xsub time downcounter and frame time downcounter are loaded from registers under software control. The contents of these registers determine the length of the Xsub time and frame time, and when the software changes the values contained in the registers the next Xsub time and frame time will reflect the changed values. The contents of these registers may be selected to minimize the frame time, consistent with the operation of the electronic image sensor, which will maximize the frame rate. This maximized frame rate allows the smoothest perceived motion possible in the digital camera's viewfinder. The present invention thus allows improved operator convenience consistent with the timing requirements of the electronic image sensor of the digital camera.

DETAILED DESCRIPTION OF THE PREFERRED EMBODIMENT

The present invention relates to a system and method for controlling image frame time periods in electronic imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, an image capture device which displays images, icons, and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention comprises a system and method for generating variable-length frame time periods in an electronic imaging device, and includes a transfer substrate charge (Xsub) time source circuit and a frame time source circuit. Both the Xsub time and frame time source circuits are loaded from registers under software control. The contents of these registers determine the length of the Xsub time and frame time, and when the software changes the values contained in the registers the next Xsub time and frame time will reflect the changed values.

Figure 1:
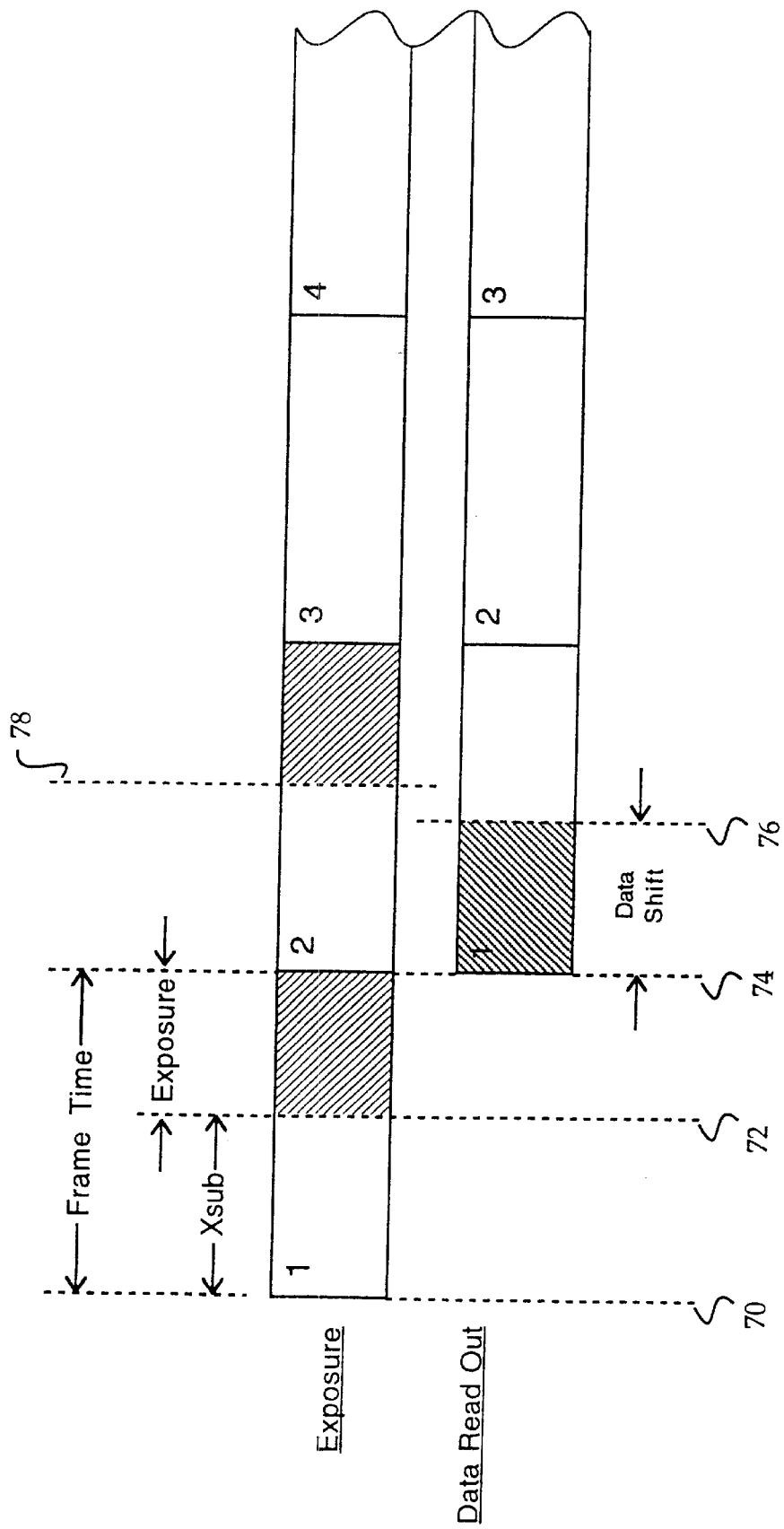
FIG. 1 is a timing diagram showing typical frame timing for a conventional digital camera device.
Figure 2:
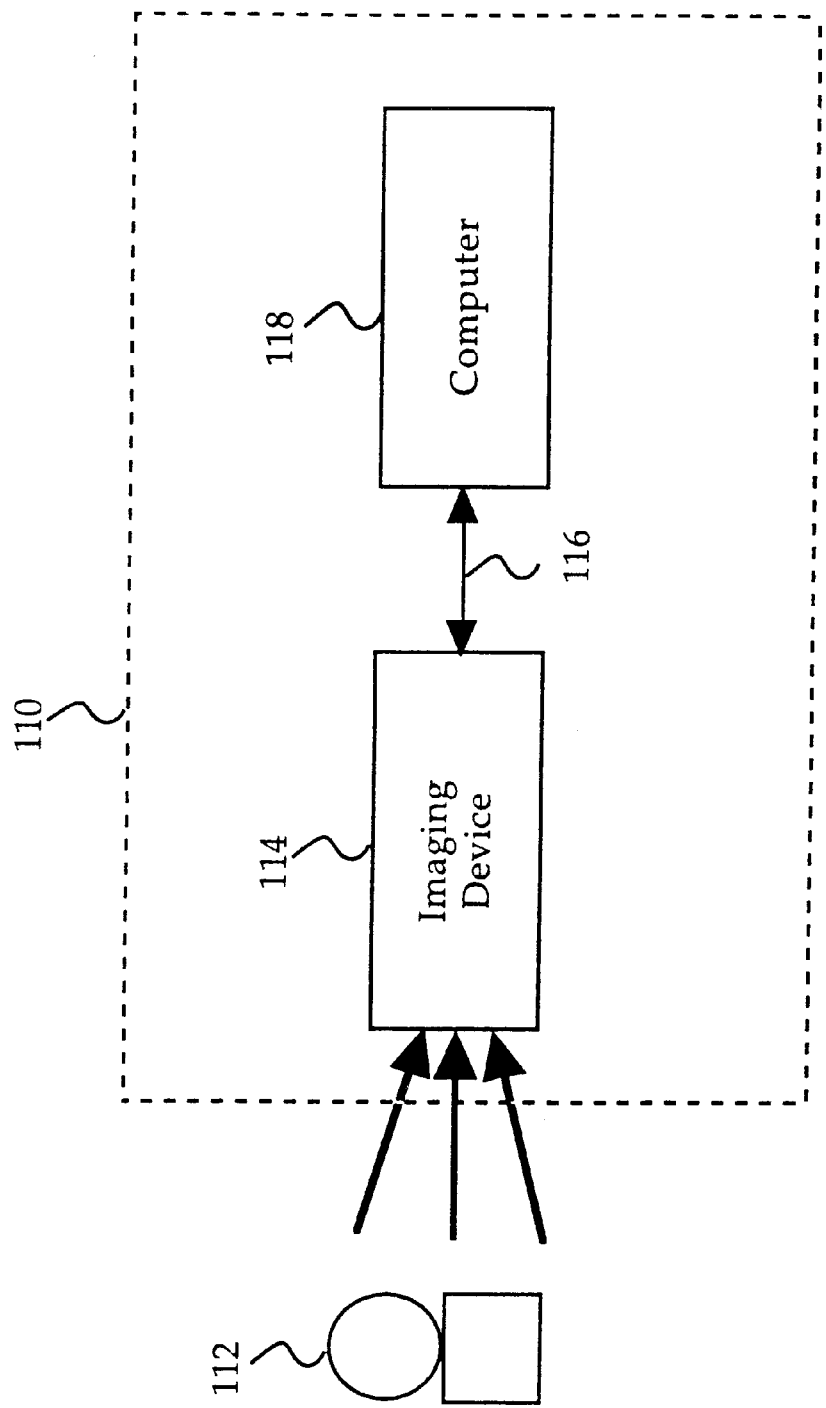
FIG. 2 is a block diagram of a digital camera, according to the present invention.

Referring now to FIG. 2, a block diagram of a digital camera 110 for use in accordance with the present invention is shown. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 3:
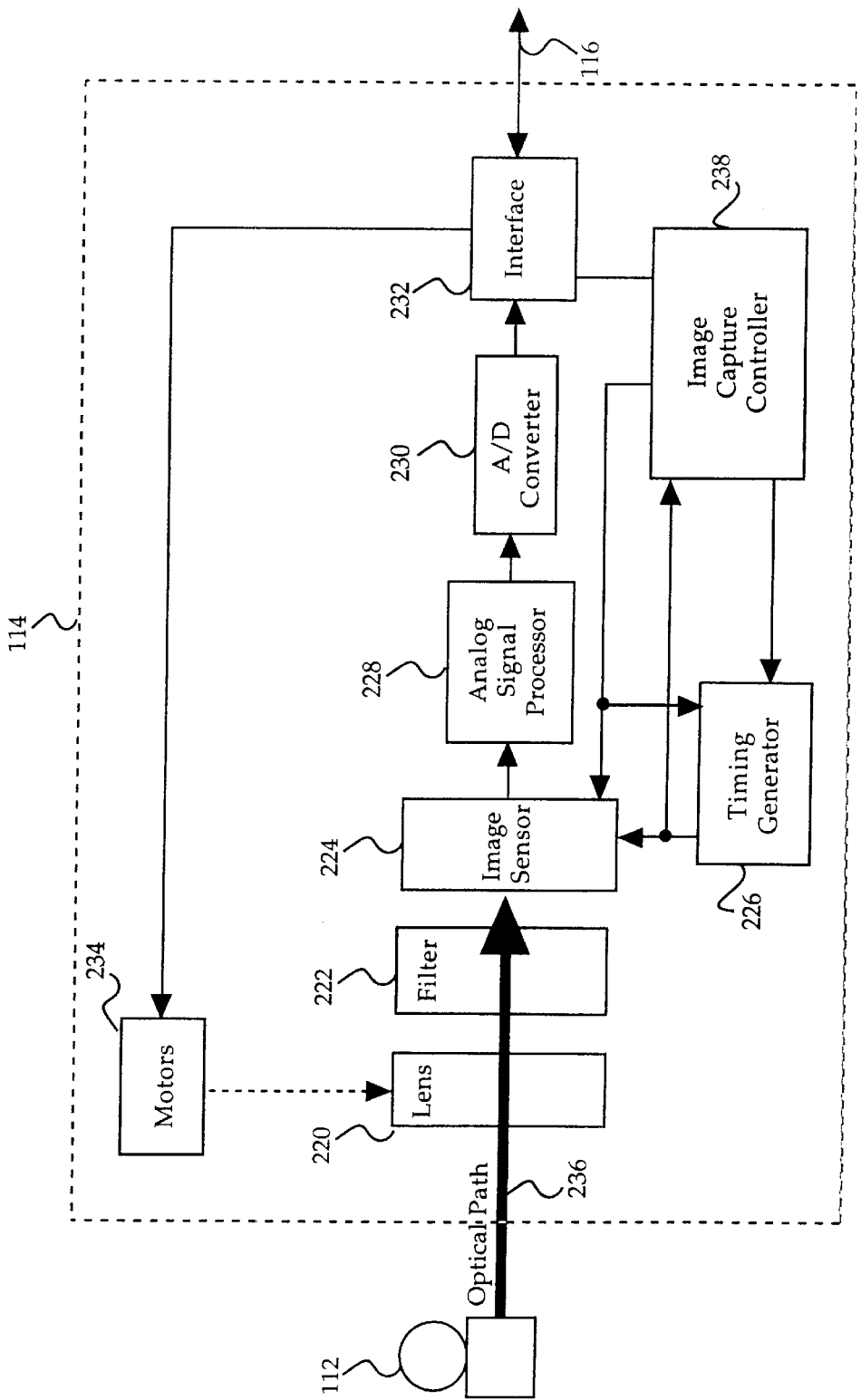
FIG. 3 is a block diagram of one embodiment for the imaging device of FIG. 2.

Referring now to FIG. 3, a block diagram of one embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, one or more motors 234, and an image capture controller (ICC) 238.

Imaging device 114 captures an image of object 112 via reflected light impacting image sensor 224 along optical path 236. Image sensor 224, which is typically a charge-coupled device (CCD), responsively generates a set of raw image data in CCD format representing the captured image 112. Timing generator 226 and image capture controller (ICC) 238 together provide a set of timing signals to effectively synchronize and control the operation of image sensor 224. ICC 238 is further discussed below in conjunction with FIG. 10. The raw image data is then routed through ASP 228, A/D converter 230 and interface 232. From interface 232, the raw image data passes over system bus 116 to computer 118.

Figure 4:
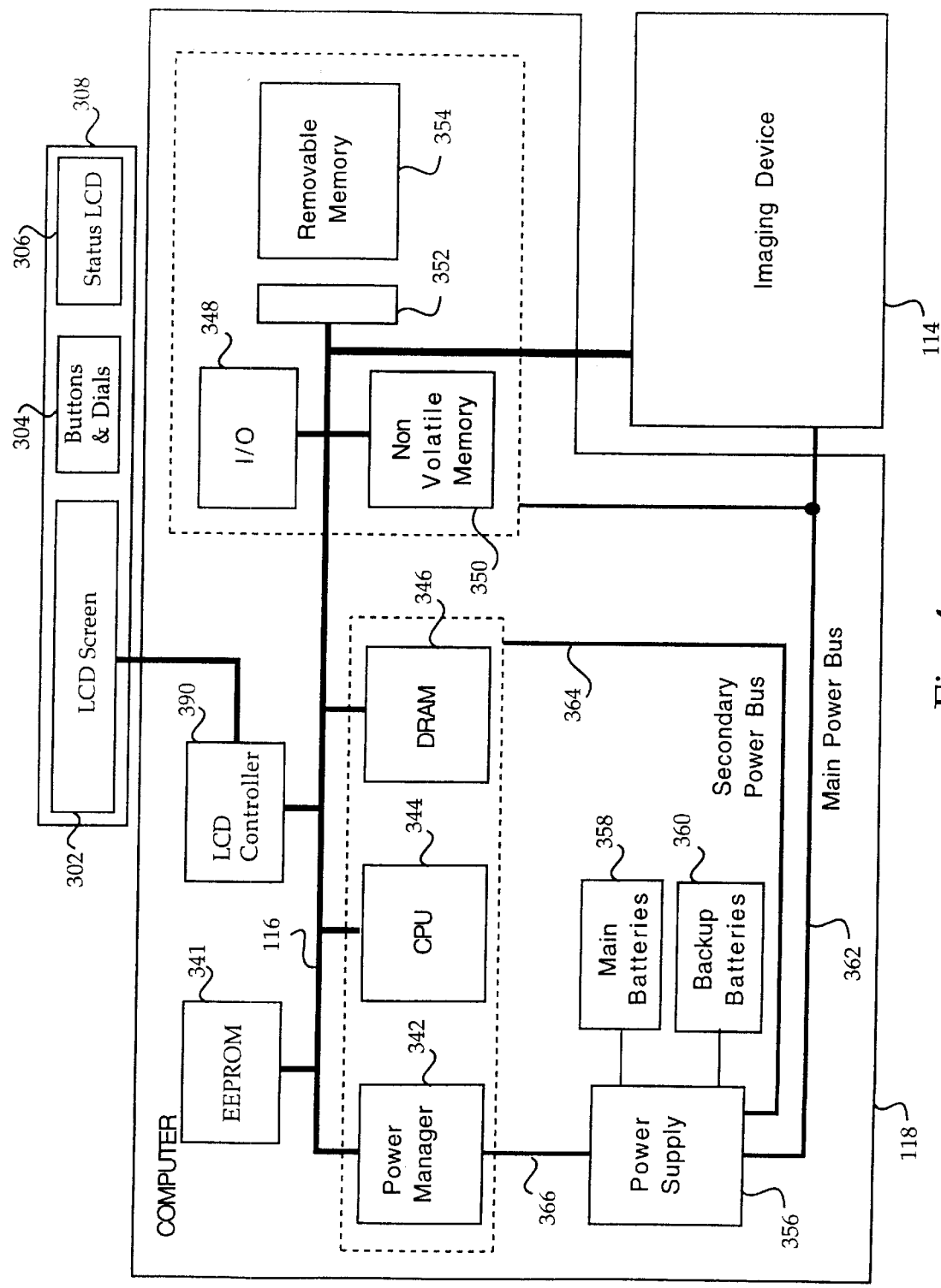
FIG. 4 is a block diagram of one embodiment for the computer of FIG. 2.

Referring now to FIG. 4, a block diagram of one embodiment for computer 118 is shown. System bus 116 provides connection paths between imaging device 114, electrically-erasable programmable read-only memory (EEPROM) 341, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. In alternate embodiments, camera 110 may also readily be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory that may be selectively allocated to various storage functions. LCD controller 390 accesses DRAM 346 and transfers processed image data to LCD screen 302 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 304, and an optional status LCD 306, which, in addition to LCD screen 302, are the hardware elements of the camera's user interface 308.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 5:
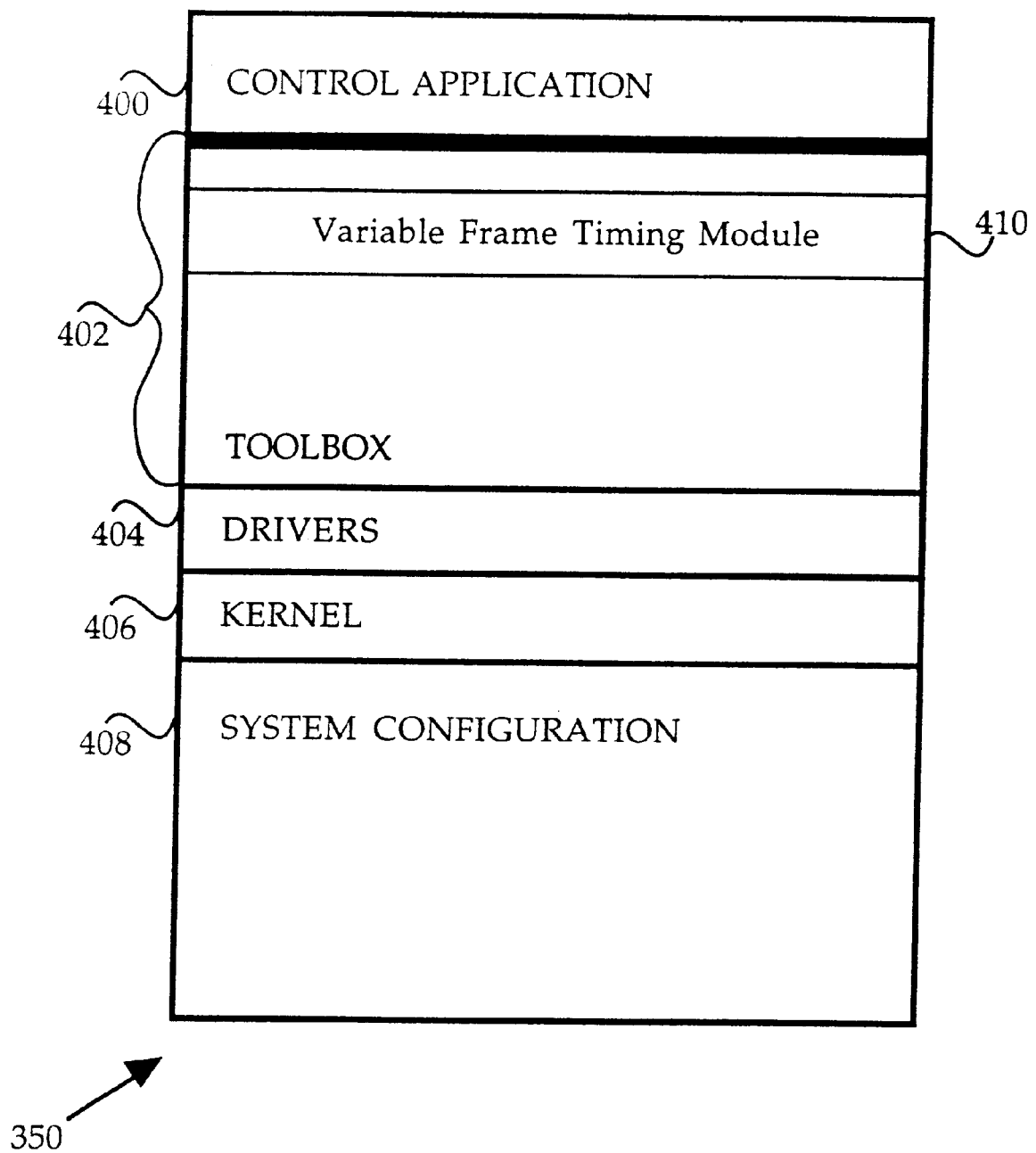
FIG. 5 is a memory map of one embodiment of the non-volatile memory of FIG. 4.

Referring now to FIG. 5, a memory map showing one embodiment of non-volatile memory 350 is shown. In the FIG. 5 embodiment, non-volatile memory 350 includes control application 400, toolbox 402, drivers 404, kernel 406 and system configuration 408.

Control application 400 comprises program instructions for controlling and coordinating the various functions of camera 110.

Toolbox 402 contains modules to perform selected functions within camera 110. Drivers 404 control various hardware devices within camera 110 (for example, motors 234). In one embodiment of the present invention, toolbox 402 contains a variable frame timing module 410 which contains program instructions for controlling the timing generator 226 and image capture controller 238. In another embodiment of the present invention, the variable frame timing module 410 may be located in drivers 404. Kernel 406 provides basic underlying services for the camera 110 operating system. System configuration 408 performs initial start-up routines for camera 110, including the boot routine and initial system diagnostics.

Figure 6:
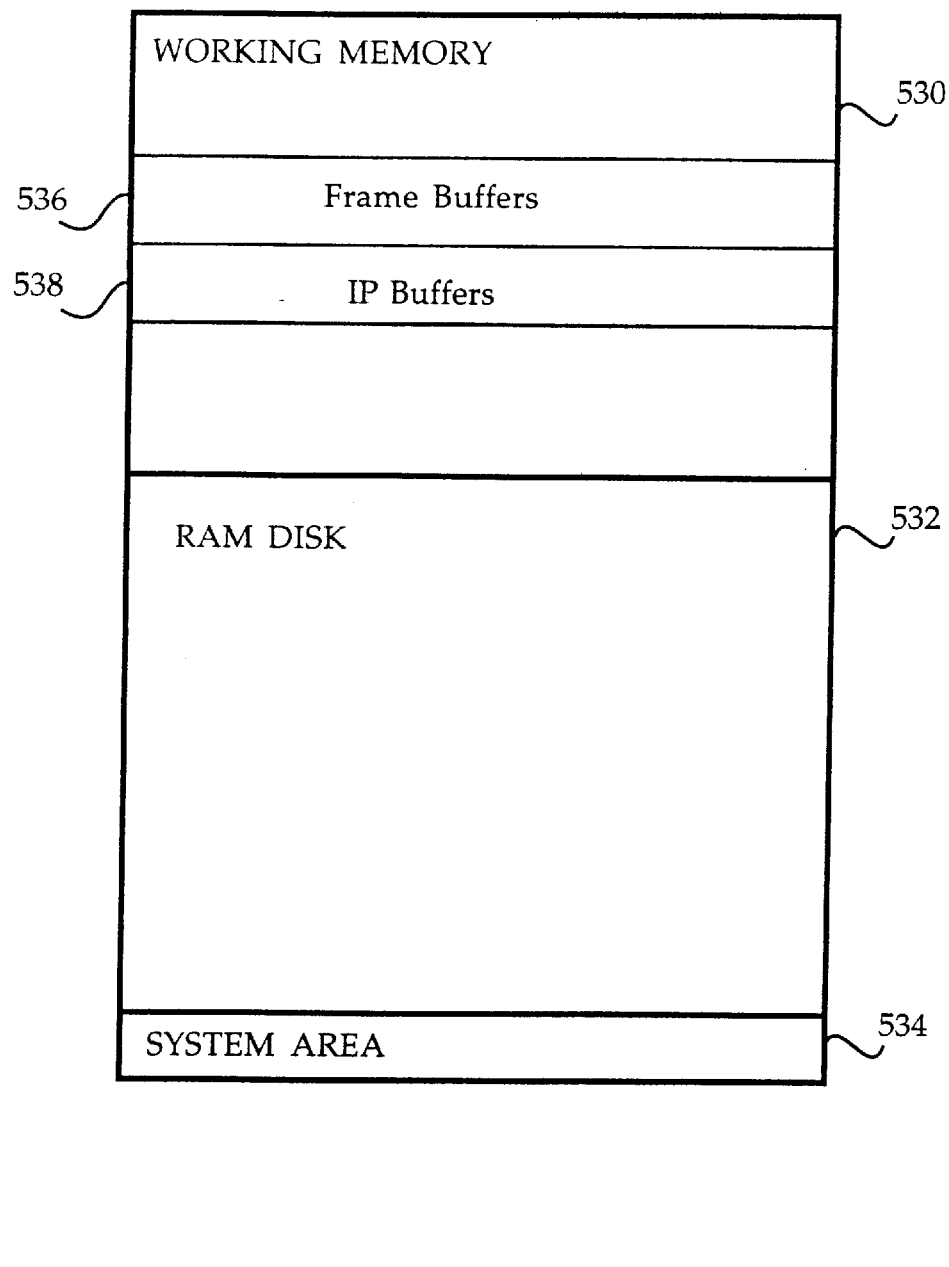
FIG. 6 is a memory map of one embodiment of a dynamic random-access-memory of FIG. 4.

Referring now to FIG. 6, one embodiment of dynamic random-access-memory (DRAM) 346 is shown. In the FIG. 6 embodiment, DRAM 346 includes RAM disk 532, a system area 534, and working memory 530.

RAM disk 532 is a memory area used for storing raw and compressed image data and typically is organized in a sectored format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes input buffers 538 for initially storing sets of raw image data received from imaging device 114 for image conversion, and frame buffers 536 for storing data for display on the LCD screen 302.

In the preferred embodiment, a conversion process is performed by a live view generation program, which is stored in non-volatile memory 350 and executed on CPU 344. However, the conversion process can also be implemented using hardware. Referring again to FIG. 4, during the execution of the live view generation program (not shown), CPU 344 takes the raw image data from input buffers 538 in CCD format and performs color space conversion on the data. The conversions process performs gamma correction and converts the raw CCD data into either a Red, Green, Blue (RGB) or a Luminance, Chrominance-red, Chrominance-blue (YCC) color format which is compatible with the LCD screen 302. After the conversion, CPU 344 stores the image data in frame buffers 536. The LCD controller 390 then transfers the processed image data from the frame buffers to the LCD screen 302 (via an optional analog converter) for display. The live view generation program therefore allows LCD screen 302 to serve as a viewfinder for camera 110 when required.

Figure 7:
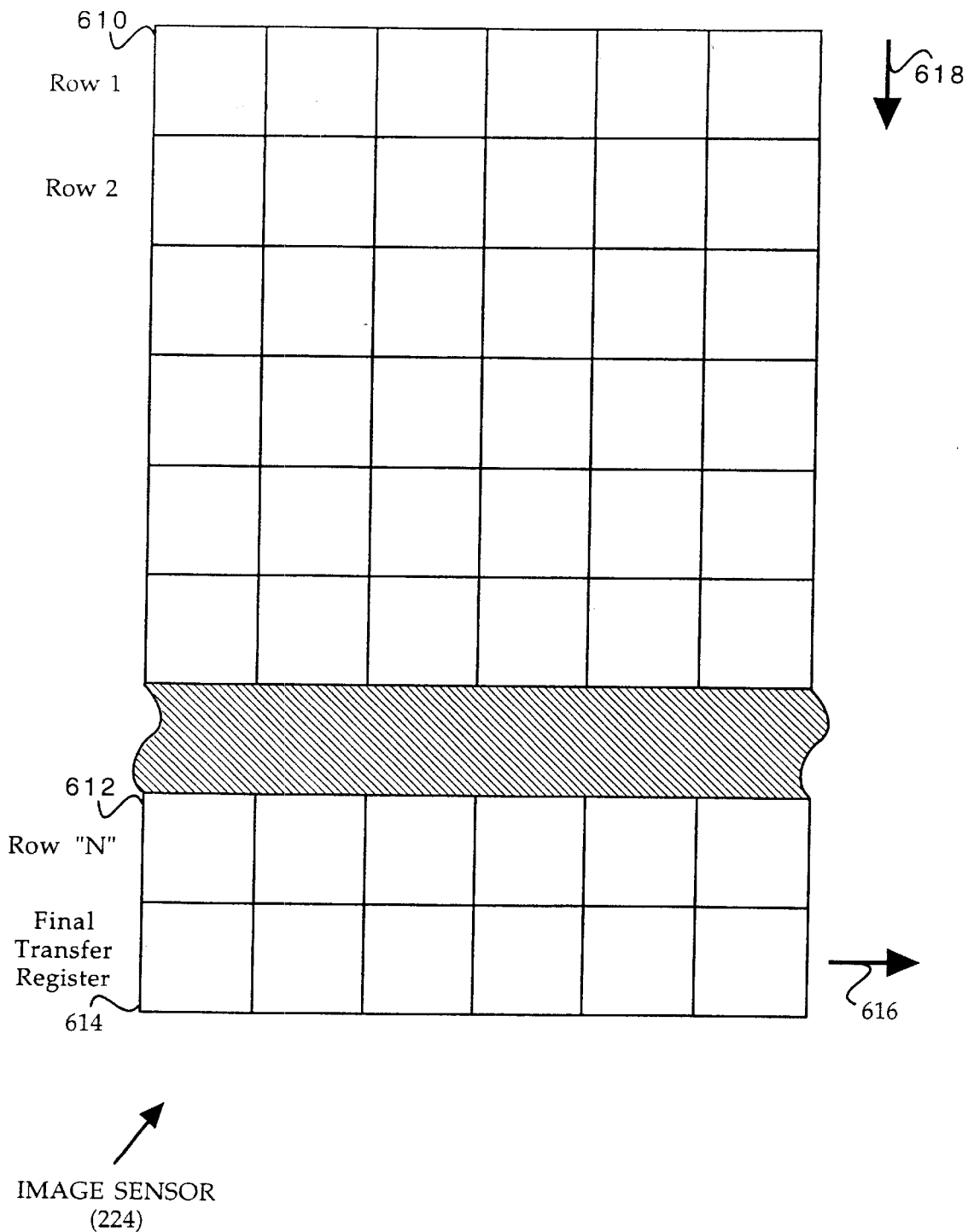
FIG. 7 is a diagram of an image sensor device, according to the present invention.

Referring now to FIG. 7, an elevation view of the light-shielded shift register of image sensor 224 (FIG. 3) is shown, in accordance with the present invention. In practice, a light-sensitive area of image sensor 224 (not shown) lies adjacent and parallel to the light-shielded shift register shown in FIG. 7. The light-sensitive area comprises the pixels that are actually exposed to the photographic target and which generate the electrical charges proportionate to the incident light intensity. The light-shielded shift register of image sensor 224 (shown in FIG. 7) comprises pixel charge storage locations in a one-to-one correspondence with the pixels on the light-sensitive area. When the exposure is complete on the light-sensitive area, all of the charges are simultaneously transferred to the corresponding pixels in the light-shielded shift register. The light-shielded shift register contains analog shift circuitry which allows for the sequential shifting of the charges into an A/D converter 230 (FIG. 3). Thus, the process of capturing an exposure and processing the resultant charges from the previous exposure may take place concurrently.

In FIG. 7, the light-shielded shift register of pixels of image sensor 224 is shown in a simplified form. The light-shielded shift register is arranged horizontally into a row 1 (610) through a row "N" (612) to form a single frame of image information. For reasons of clarity, row 1 (610) through row "N" (612) each contains six picture elements, however, in actual practice, row 1 (610) through row "N" (612) each typically contain a substantially greater number of picture elements.

Below and adjacent to row "N", image sensor 224 includes a final transfer register 614. In operation, the light-sensitive area of image sensor 224 captures a selected image during an exposure period and then responsively transfers the resulting charges to the light-shielded shift register. The light-shielded shift register serially outputs the picture element charges using a "bucket brigade" or "shift-register" technique. Initially, final transfer register 614 is sequentially emptied in the direction shown by arrow 616. Next, row 1 (610) through a row "N" (612) are each shifted down one row in the direction shown by arrow 618. Then, the above process is repeated until the entire light-shielded shift register of image sensor 224 is empty and ready to receive another set of image data from the light sensitive area.

Due to the complexity of the high-speed process involved in shifting captured image data out of image sensor 224, camera 110 uses timing generator 226 and image capture controller 238 which together effectively generate a series of precise timing pulses and signals to gate the image data from image sensor 224. Examples of the generated timing signals include a horizontal register transfer clock for gating picture elements from final transfer register 614, a vertical register transfer clock for synchronizing the vertically downward shifts of row 1 (610) through row "N" (612), and a horizontal drive (HD) signal that occurs after each one of row 1 (610) through row "N" (612) is sequentially shifted out of final transfer register 614.

Figure 8:
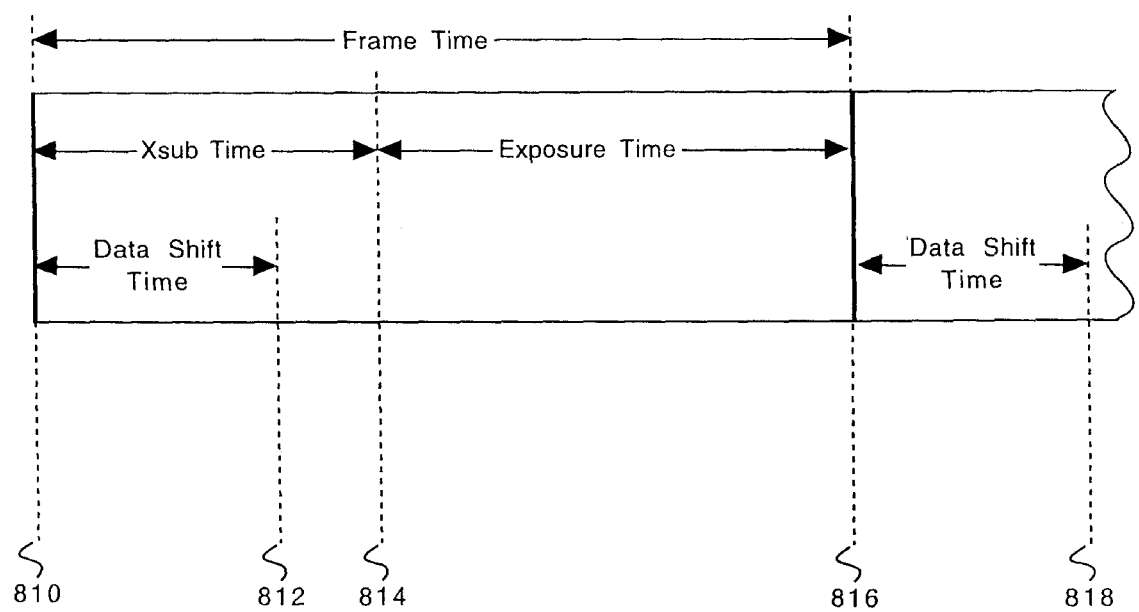
FIG. 8 is a timing diagram for a preferred variable-length frame, according to the present invention.

Referring now to FIG. 8, a timing diagram for a preferred variable-length frame is shown. The frame time length may be defined as the sum of the Xsub time length and the exposure time length. For this reason, any two times chosen from the set consisting of the frame time, the Xsub time, and the exposure time may be independent variables. The remaining time will always depend upon the other two times chosen. In the preferred embodiment of the present invention, the frame time length and the Xsub time length are used as the independent variables. The exposure time length is then derived by subtracting the Xsub time length from the frame time length. Other embodiments of the invention may include selecting the frame time length and the exposure time length, or the Xsub time length and the exposure time length, as the independent variables.

In order that the frame time length and the Xsub time length may be freely varied in a digital system, a unit of timing measurement must be chosen. In the preferred embodiment of the present invention, the unit of time chosen is the length of the horizontal drive (HD) pulse. The HD pulses take the form of a free-running square wave, and are among the shortest time length pulses available in the typical set of timing signals required for an image sensor system. Selection of the HD pulses as a timing unit advantageously provides a constantly running clock signal and a high resolution of the variable timing. In other embodiments of the present invention other timing units may be chosen.

As an example of setting the variable time lengths, consider an image sensor which is a CCD having a pixel resolution corresponding to the Video Graphic Adapter (VGA) standard. In this case, the length of the HD pulses is approximately 64 microseconds. Using a 16-bit word as a binary digital representation of the length of a time period, the length may vary from zero time (zero times 64 microseconds) to a little over 4 seconds (2 to the $16^{th}$ power times 64 microseconds). Compared with a standard $\frac{1}{30}^{th}$ of a second frame, which is approximately 33.3 milliseconds long, it is apparent that 64 microsecond time units provides a high resolution measurement of time. Continuing in this example, assign the frame time length to be 625 (decimal) time units and the Xsub time length to be 400 (decimal) time units. The dependent variable, exposure time length, will then be 625−400=225 (decimal) time units. For the 64 microsecond time unit, these correspond to a frame time length of 0.04 seconds ($\frac{1}{25}^{th}$ of a second), a Xsub time length of 0.0256 seconds, and an exposure time of 0.0144 seconds.

Referring again to FIG. 8, solutions to several problems presented above in the Background of the Invention are discussed. The basic principle is that the frame time must be longer in duration than the longer of either the exposure time or the data shift time. If an exposure time somewhat in excess of $\frac{1}{30}^{th}$ of a second is required, and this exposure time is longer than the anticipated data shift time, the frame time length (from time 810 to time 816) may be selected as slightly longer than the exposure time and the Xsub time length (from time 810 to time 814) may be selected as the difference between this frame time length and the required exposure time length. This will yield the minimum length frame time, which in many cases will be much shorter than two of the fixed $\frac{1}{30}^{th}$ of a second frame times. As a consequence, the display generated by the live view program and shown on LCD screen 302 as the viewfinder for camera 110 will have the greatest possible frame rate and the smoothest perceived motion possible under the circumstances.

Similarly, if the data shift time length must be lengthened due to other system demands upon processing resources, and this time is greater than the required exposure time, the frame time length may be selected as slightly longer than the anticipated data shift time, and the Xsub time may be selected as the difference between this calculated frame time length and the exposure time length. This will again yield the minimum length frame time and thus the greatest possible frame rate.

Figure 9:
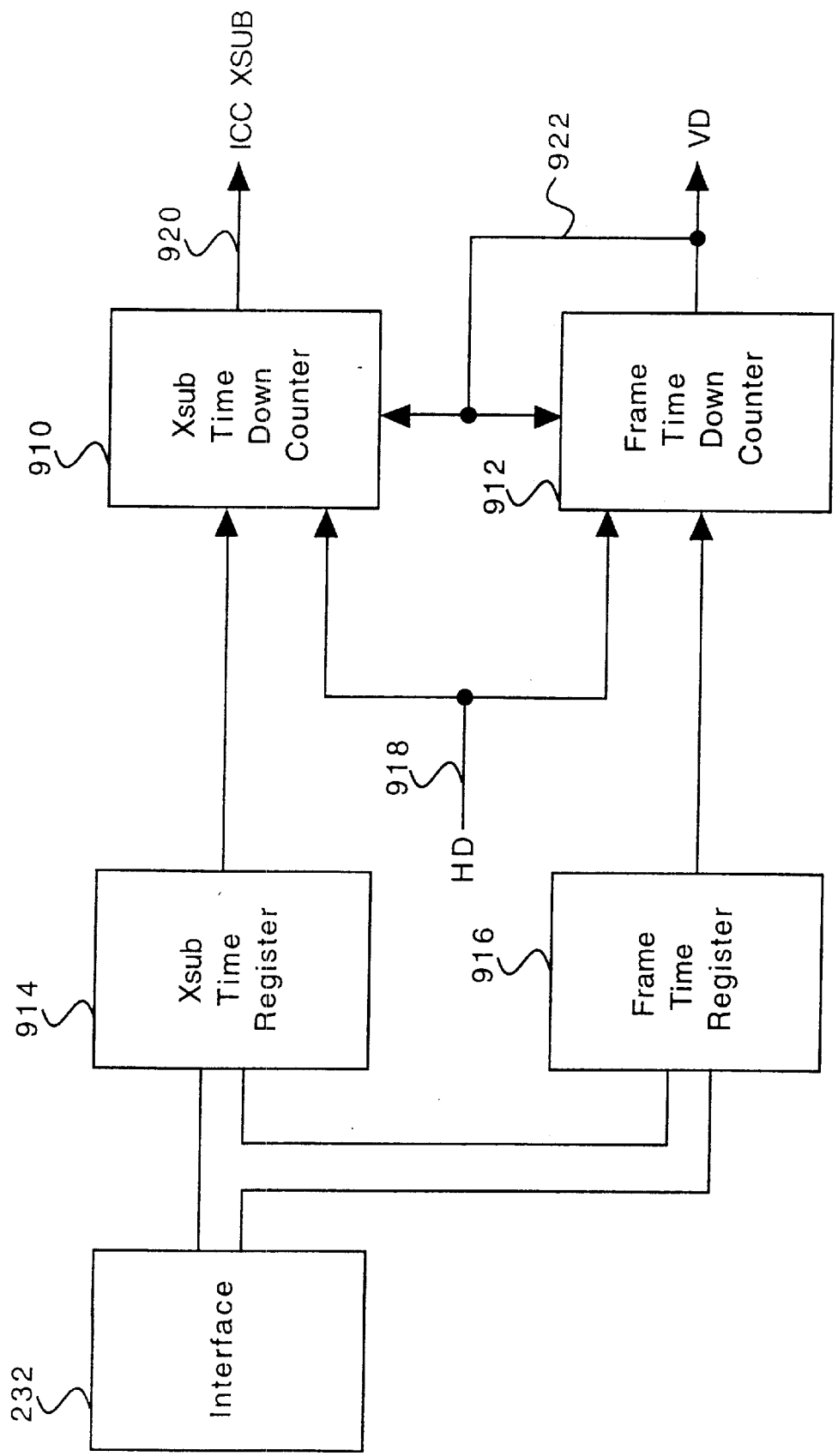
FIG. 9 is a block diagram showing a basic system for generating a variable-length frame, according to the present invention.

Referring now to FIG. 9, a block diagram of a basic system for generating a variable-length frame is shown. In the preferred embodiment, the time lengths are generated through the use of downcounters. A downcounter is a device which decrements by one an internal value every time a clock pulse is received. A binary number representing a selected time length is loaded into a downcounter. When a free-running clock signal, whose period is the unit for measuring time, is applied to the downcounter, the downcounter decrements by one the originally-loaded value with each clock pulse until the value within the downcounter reaches zero. The time at which the value within the downcounter reaches zero, with respect to the time the original value was loaded into the downcounter, occurs exactly at the number originally loaded into the downcounter multiplied by the clock signal period. Thus, once a clock signal with a standard period is chosen as a unit of time measurement, a downcounter may be used to generate signals at arbitrary multiples of the clock signal period.

Referring again to FIG. 9, in the case of the preferred embodiment of the present invention, two downcounters are used: the Xsub downcounter 910 for determining the Xsub time length and the frame time downcounter 912 for determining the frame time length. At some time prior to the beginning of a selected frame, binary numbers corresponding to the desired Xsub time length and frame time length are stored by the variable frame timing module 410 (FIG. 5) via interface 232 into the Xsub time register 914 and frame time register 916, respectively. These binary numbers will remain in the registers until the variable frame timing module 410 changes them to new values. At the actual beginning of the selected frame, a transition of the VD signal on the VD signal line 922 loads the current values of the Xsub time register 914 and the frame time register 916 into the Xsub time downcounter 910 and frame time downcounter 912, respectively. Once loaded with these values, the two downcounters 912 and 916 decrement by one the values every time an HD pulse on the HD signal line 918 is received. Because the Xsub time will always be shorter than the frame time, the Xsub time downcounter 910 reaches a value of zero before the frame time downcounter 912. At this point in time, the Xsub downcounter 912 generates signal transitions representing the end of the Xsub time and the beginning of the exposure time. Important among these is an enable signal on the ICC_XSUB signal line 920, which enables the sending of Xsub pulses, generated by timing generator 226, to the CCD only during the time between the beginning of the frame and the time at which the Xsub time downcounter 910 reaches zero. At this point in time, the signal on the ICC_XSUB signal line 920 changes state, prevents the Xsub pulses from reaching the CCD, and thus allows the exposure to take place.

The frame time downcounter 912 continues to count down after the Xsub time downcounter 910 reaches zero. When the frame time downcounter 912 reaches zero, signal transitions representing the end of the frame time and the beginning of the next frame, including VD transitions on the VD signal line 922, are generated. The Xsub time downcounter 910 and frame time downcounter 912 are again loaded with the values stored in the Xsub time register 914 and frame time register 916, and the next frame begins.

Figure 10:
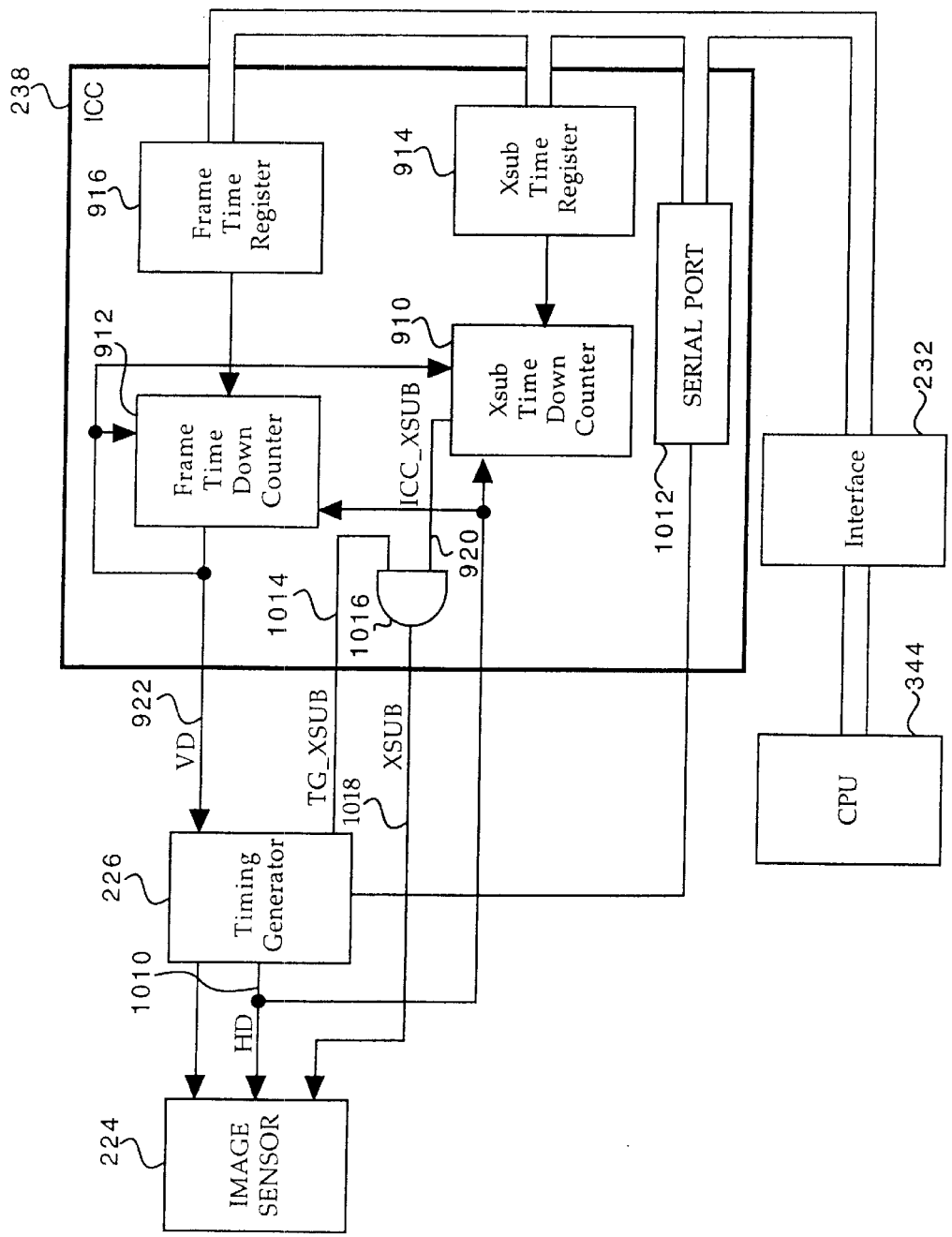
FIG. 10 is a block diagram of the preferred embodiment for generating a variable-length frame, including the image capture controller of FIG. 3.

Referring now to FIG. 10, a block diagram of the preferred embodiment for generating a variable-length frame, including the image capture controller (ICC) 238 of FIG. 3, is shown. The timing generation downcounters of FIG. 9 are shown in system context.

The timing generator 226 generates HD signals on the HD signal line 1010 for use by the image sensor 224. These HD pulses are also used by the image capture controller 238 as units of time measurement. Every time an HD pulse is applied to the frame time downcounter 912 and Xsub time downcounter 910, the downcounters decrement by one.

The timing generator 226 is configured by software control via the interface 232 and the serial port 1012 to accept, rather than generate, the VD signal on the VD signal line 922. Whenever the frame time downcounter 912 changes the state of VD to initiate a new frame time, this VD signal not only is used by the timing generator 226 to control the image sensor 224, but also is used internally by ICC 238 to shift the contents of the frame time register 916 and Xsub time register 914 into the frame time downcounter 912 and Xsub time downcounter 910, respectively.

The free running Xsub pulses generated by timing generator 226 (shown as the TG_XSUB signal on the TG_XSUB signal line 1014) are gated by the ICC_XSUB signal at logic gate 1016. During the time that the Xsub time downcounter 910 is counting down to zero, the TG_XSUB pulses are allowed through logic gate 1016 to reach image sensor 224 via the XSUB signal line 1018. Thus, during this time, the image charge buildup on the image sensor 224 is suppressed. When the Xsub time downcounter 910 reaches zero, the ICC_XSUB signal on the ICC_XSUB signal line 920 changes state and blocks the TG_XSUB pulses from reaching the image sensor on the XSUB signal line 1018. Thus, during the period when the TG_XSUB pulses are blocked, image sensor 224 is enabled to capture an exposure.

Figure 11:
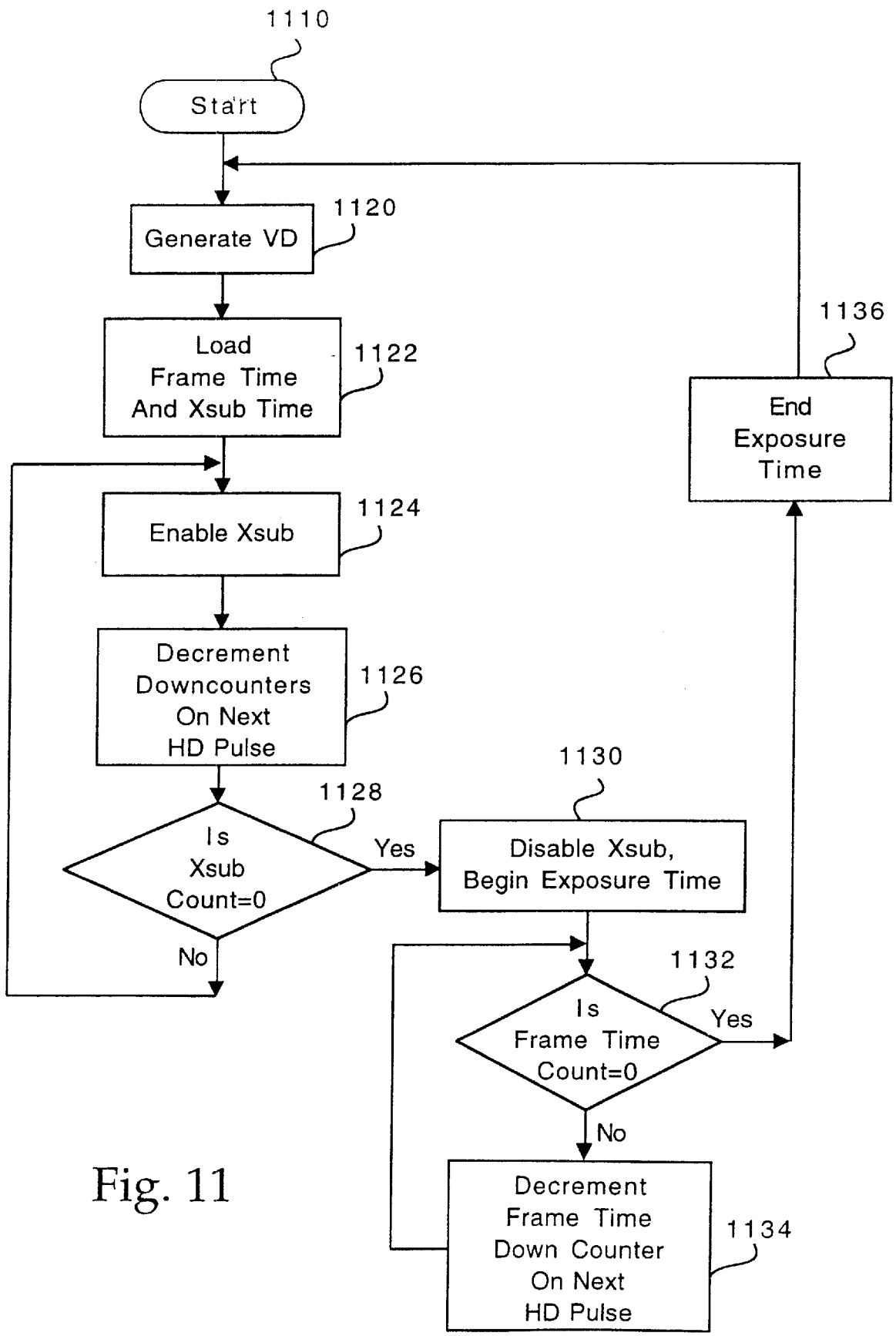
FIG. 11 is a flowchart of method steps for generating variable-length timing signals, according to the present invention.

Referring now to FIG. 11, a flowchart of method steps for generating variable-length timing signals is shown. At the time the process begins, in step 1110, it is assumed that the variable frame timing module 410 has configured timing generator 226 to accept externally generated VD signals and that the variable frame timing module 410 has loaded initial digital values for frame time length and Xsub time length into the frame time register 916 and Xsub time register 914, respectively.

In step 1120, the frame time downcounter 912 generates the VD signal to begin a new frame time. The VD signal changes state and, in step 1122, loads the digital values from frame time register 916 and Xsub time register 914 into the frame time downcounter 912 and Xsub time downcounter 910, respectively. Then, in step 1124, as Xsub time downcounter 910 is loaded, Xsub time downcounter 910 sets the ICC_XSUB signal to the level which enables the TG_XSUB pulses to reach image sensor 224. After Xsub time downcounter 910 sets the current level of ICC_XSUB, in the following step 1126 the current values contained in the Xsub time downcounter 910 and the frame time downcounter 912 are decremented. Then, in step 1128, after each time that the counters are decremented, a decision is made based upon whether or not Xsub downcounter 910 contains digital value zero. If the Xsub downcounter 910 does not contain zero, then previous steps 1124, 1126 and 1128 are repeated. If, however, the Xsub downcounter 910 does contain zero, then ICC_SUB signal is set to the level which disables TG_XSUB pulses from reaching image sensor 224. At step 1130, the Xsub time ends and the exposure time begins.

In step 1132, another decision is now made based upon whether or not frame time downcounter 912 contains digital value zero. If the frame time downcounter 912 does not contain zero, then in step 1134 the frame time downcounter 912 is decremented when the next HD pulse arrives. After each decrement, the decision in step 1132 is repeated. If, however, the frame time downcounter 912 does contain zero, then in step 1136 the exposure time is ended. The charges stored in the array of photodiodes are transferred to the parallel array of analog storage locations, and the process of converting the analog charges stored in the parallel array into digital values is initiated.

As the exposure time ends, so does the frame time. Immediately after the exposure time ends in step 1136, another VD change of state occurs, in step 1120, and the entire process of FIG. 11 repeats.

Note that in step 1122, the present values in the frame time register 916 and Xsub time register 914 are loaded into the frame time downcounter 912 and Xsub time downcounter 910. If, at any time prior to the VD signal transition, the values in the frame time register 916 and Xsub time register 914 were changed by variable frame timing module 410, then these new values are used in the immediately following frame. The new values would be loaded into the frame time downcounter 912 and Xsub time downcounter 910 by the VD signal transition. Thus the frame time length and Xsub time length may be changed from frame to frame under software control.

The invention has been explained above with reference to a preferred embodiment. Other embodiments will be apparent to those skilled in the art in light of this disclosure. For example, the present invention may readily be implemented using configurations other than those described in the preferred embodiment above. Specifically, the circuits implemented in this disclosure as parts of separate components, timing generator 226 and image capture controller 238, may be combined in a single integrated circuit. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for generating variable frame-rates in an electronic imaging device, comprising:

a frame time period for capturing an image frame;

a transfer substrate charge time period initiated at a beginning of said frame-time period for keeping said electronic imaging device in a discharge state;

an exposure time-period beginning at an end of said transfer substrate charge time period for charging elements of said electronic imaging device; and first and second source circuits coupled to said electronic imaging device for providing time values for any two of said frame time period, said transfer substrate charge time period, and said exposure time period, and for deriving a value for said third time period from said selected two time periods;

wherein said provided time values are selected based on existing system conditions to minimize said frame time period and to therefore maximize said frame rate, while avoiding frame skipping.

2. The system of claim 1 wherein said electronic imaging device comprises a charge-coupled device.

3. The system of claim 2 wherein said first source circuit is a transfer substrate charge time source circuit and said second source circuit is a frame time source circuit.

4. The system of claim 3 wherein said transfer substrate charge time source circuit and said frame time source circuit comprise downcounters.

5. The system of claim 4 wherein said downcounters are decremented by a pulse train having said time unit.

6. The system of claim 5 wherein said time periods are multiples of a time unit that is a period of a horizontal drive pulse.

7. The system of claim 4 wherein said transfer substrate charge time source circuit downcounter and said frame time source circuit downcounter are loaded from registers.

8. The system of claim 7 wherein said registers are controlled by a software program.

9. The system of claim 3 wherein the exposure time period is derived by a difference in the signals generated by said transfer substrate charge time source circuit and said frame time source circuit.

10. The system of claim 2 wherein said time values are provided for said transfer substrate change time period and said frame time period.

11. The system of claim 10, wherein said electronic imaging device is a digital camera.

12. A method for generating variable frame-rates in an electronic imaging device, comprising:

generating a frame time period for capturing an image frame;

generating a transfer substrate charge time period initiated at a beginning of said frame time period for keeping said electronic imaging device in a discharge state;

generating an exposure time-period beginning at an end of said transfer substrate charge time period for charging elements of said electronic imaging device; and providing first and second source circuits coupled to said electronic imaging device for providing time values for any two of said frame time period, said transfer substrate charge time period, and said exposure time period, and for deriving a value for said third time period from said selected two time periods;

wherein said provided time values are selected based on existing system conditions to minimize the frame time period and to therefore maximize the frame rate, while avoiding frame skipping.

13. The method of claim 12 wherein said electronic imaging device comprises a charge-coupled device.

14. The method of claim 13 wherein said time values are provided for said transfer substrate charge time period and said frame time period.

15. The method of claim 14 wherein said first source circuit is a transfer substrate charge time source circuit and said second source circuit is a frame time source circuit.

16. The method of claim 15 wherein said transfer substrate charge time source circuit and said frame time source circuit comprise downcounters.

17. The method of claim 16 wherein said downcounters are decremented by a pulse train having said time unit.

18. The method of claim 17 wherein said time periods are multiples of a time unit that is a period of a horizontal drive pulse.

19. The method of claim 16 wherein said transfer substrate charge time source circuit downcounter and said frame time source circuit downcounter are loaded from registers.

* * * * *